United States Patent [19]

Lin

[11] Patent Number: 5,945,140
[45] Date of Patent: Aug. 31, 1999

[54] MOLDING SYSTEM WITH LEAKAGE SEALING AND COOLING WATER GUIDE MEANS

[76] Inventor: Chih-Miao Lin, No. 103, Lane 70, Shen-Lin Rd., Shen-Kang Hsiang, Taichung County, Taiwan

[21] Appl. No.: 09/033,960

[22] Filed: Mar. 3, 1998

[51] Int. Cl.[6] .................................................. B29C 45/73
[52] U.S. Cl. .............................. 425/552; 425/446; 249/79
[58] Field of Search .............................. 249/79; 164/128; 165/108, DIG. 535; 199/56; 425/552, 446; 264/237

[56] References Cited

U.S. PATENT DOCUMENTS

| | | | |
|---|---|---|---|
| 4,966,544 | 10/1990 | Mitake | 425/552 |
| 5,631,030 | 5/1997 | Brun, Jr. et al. | 249/79 |

*Primary Examiner*—Harold Pyon
*Assistant Examiner*—Mark A. Wentink
*Attorney, Agent, or Firm*—Rosenberg, Klein & Bilker

[57] ABSTRACT

A molding system includes a bottom die having a bottom blind hole, an upper die controlled to mold a molding with the bottom die, and a water circulation system connected to the bottom die at a bottom side and having a T-hole disposed in communication with the blind hole on the bottom die for circulation of cooling water to cool down the bottom die and the molding molded in between the bottom die and the upper die, a leakage sealing device mounted between the water circulation system and the bottom die to seal the gap and to divide the T-hole into a water inlet and a water outlet, and a spiral water guide mounted on the bottom die and pressed against the leakage sealing device, the spiral water guide defining a spiral water circulation passage in the blind hole in bottom die for guiding cooling water from the water inlet to the water outlet through the blind hole in a spiral manner to evenly and quickly cool down the bottom die.

1 Claim, 3 Drawing Sheets

A-A

5,945,140

MOLDING SYSTEM WITH LEAKAGE SEALING AND COOLING WATER GUIDE MEANS

BACKGROUND OF THE INVENTION

The present invention relates to a molding system for molding plastics into desired finished products, and more specifically to such a molding system which has a leakage sealing and cooling water guide means to seal the gap and to guide cooling water in a spiral way.

FIG. 1 shows a molding system according to the prior art. This structure of molding system comprises a water circulation system 13' having a T-hole 130 for circulation of cooling water and a mounting groove 133' at the top, a bottom die 11' mounted on the water circulation system 13' and having a bottom blind hole 110', an upper die 10' controlled to mold a molding 12' with the bottom die 11', an O-ring 19' mounted in the mounting groove 133' on the water circulation system 13' and pressed below the bottom die 11', and a partition plate 14' mounted in the T-hole 130' and the bottom blind hole 110'. The partition plate 14' divides the T-hole 130' into a water inlet 131' and a water outlet 132', and defines a U-shaped water circulation passage 111' in the bottom blind hole 110' between the water inlet 131' and the water outlet 132' (see also FIG. 1A). This structure of molding system is still not satisfactory in function, and has numerous drawbacks as outlined hereinafter.

1. Because the O-ring 19' is directly mounted in the mounting groove 133' at the top of the water circulation system 13', it tends to be forced to displace by the bottom die 11' or the flowing flow of cooling water, causing a leakage.

2. The limited contact area between the O-ring 19', the bottom die 11' and the mounting groove 133' cannot effectively stop cooling water from passing out of the water circulation passage.

3. Because the water circulation passage 111' is a U-shaped passage, the temperature of water in the front half 15' of the water circulation passage 111' is relatively lower then that in the rear half 16' of the water circulation passage 111', thereby resulting in the bottom die 11' being unevenly cooled down.

4. Because the water circulation passage 111' is a U-shaped passage, cooling water passes through the water circulation passage 111' quickly, causing the bottom die 11' unable to be evenly and efficiently cooled down.

SUMMARY OF THE INVENTION

The present invention has been accomplished to provide a molding system which eliminates the aforesaid drawbacks. According to the present invention, the molding system comprises a bottom die having a bottom blind hole, an upper die controlled to mold a molding with the bottom die, and a water circulation system connected to the bottom die at a bottom side and having a T-hole disposed in communication with the blind hole on the bottom die for circulation of cooling water to cool down the bottom die and the molding molded in between the bottom die and the upper die, a leakage sealing device mounted between the water circulation system and the bottom die to seal the gap and to divide the T-hole into a water inlet and a water outlet, and a spiral water guide mounted on the bottom die and pressed against the leakage sealing device, the spiral water guide defining a spiral water circulation passage in the blind hole in bottom die for guiding cooling water from the water inlet to the water outlet through the blind hole in a spiral manner to evenly and quickly cool down the bottom die. Because cooling water passes through the water circulation passage in a spiral way, cooling water circulation time is relatively increased, and therefore the bottom die can be evenly and efficiently cooled down. Because the O-rings are mounted on the annular holder block which fits into the mounting groove on the water circulation system, the O-rings are firmly retained in place to seal the gap between the water circulation system and the bottom die. Further, the annular holder block is made from heat resisting non-metal material, it does not deform when heated by hot water, and the O-rings are well protected.

DETAILED DESCRIPTION OF THE PREFERRED EMBODIMENT

Figure 1A:
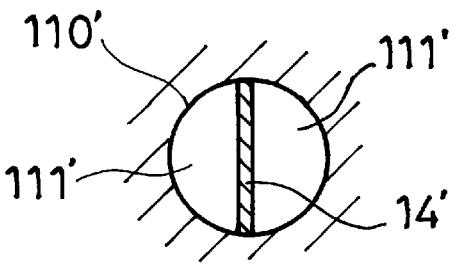
FIG. 1A is a partial cross-sectional view taken along the section line A—A of FIG 1.
Figure 1:
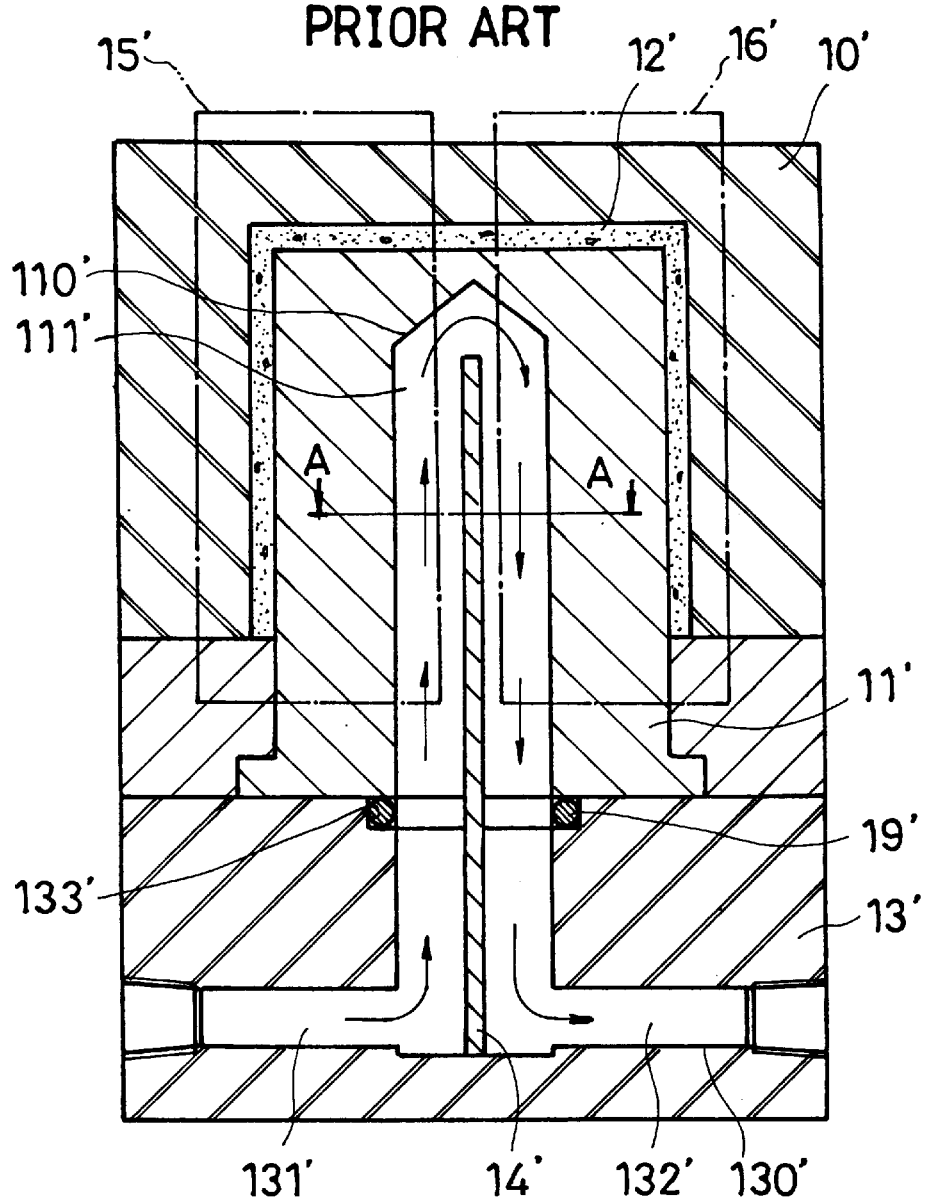
FIG. 1 is a sectional view of a molding system according to the prior art.
Figure 2:
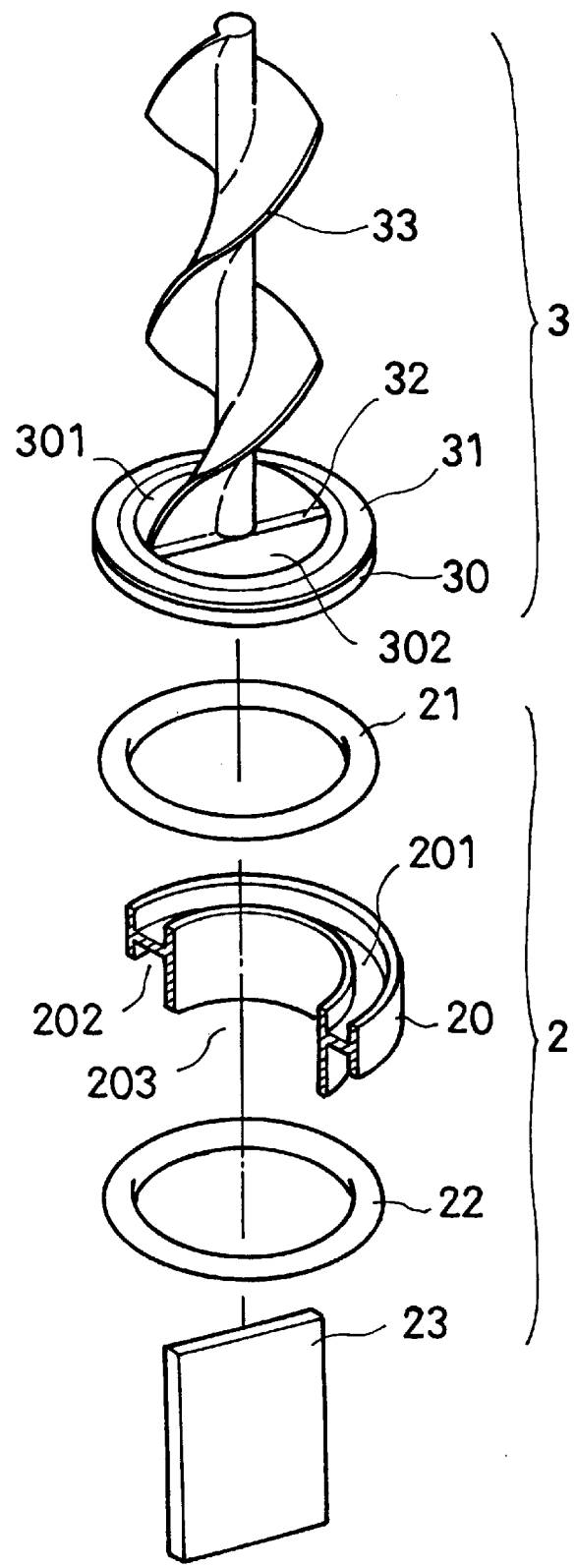
FIG. 2 is an exploded view of a leakage sealing device and a cooling water guide device according to the present invention.
Figure 3:
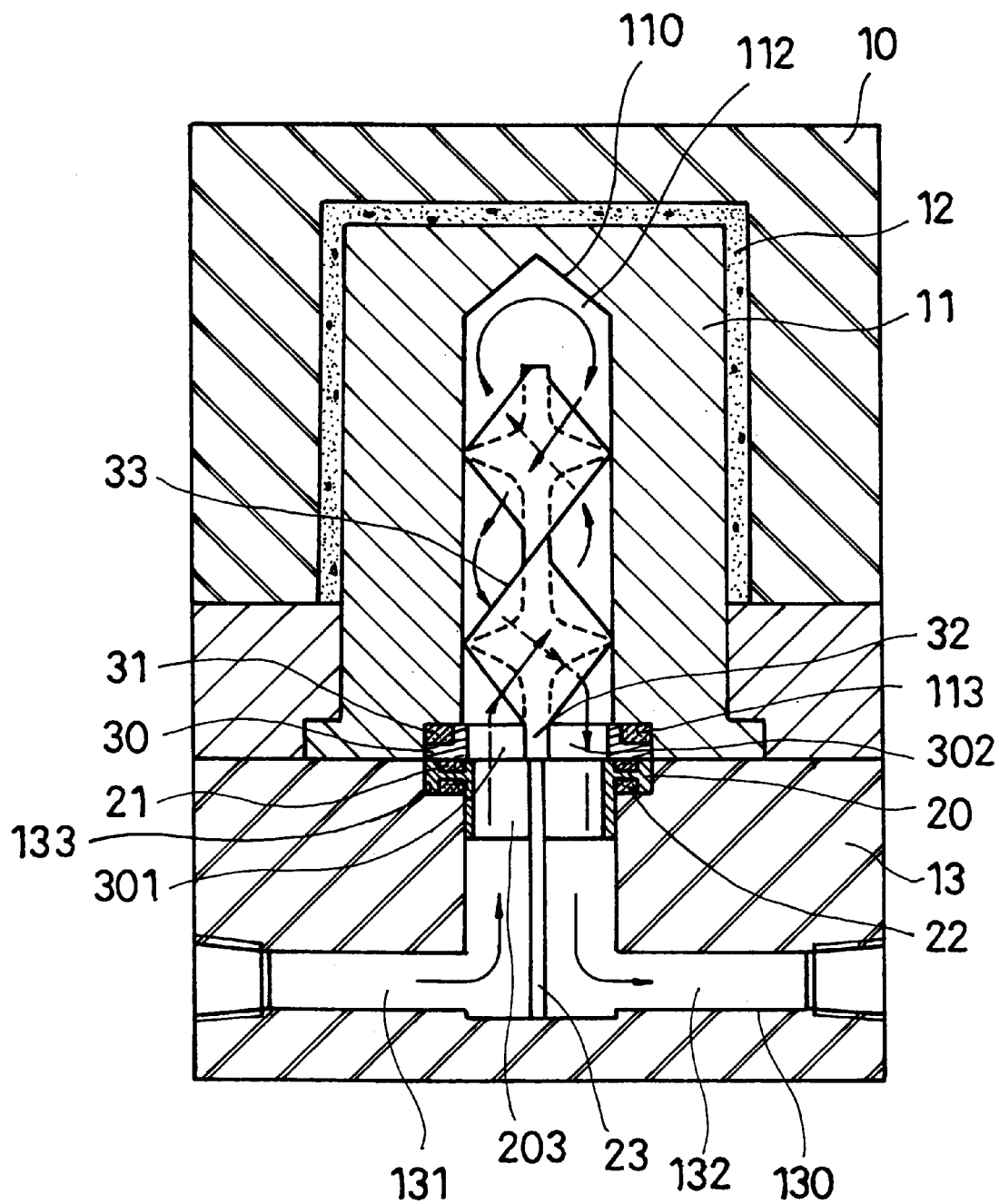
FIG. 3 is a sectional view of the present invention, showing the leakage sealing device and the cooling water guide device installed in the water circulation system and the bottom die.

Referring to FIGS. 2 and 3, the leakage sealing device, referenced by 2, is comprised of an annular holder block 20, two O-rings namely the first O-ring 21 and the second O-ring 22, and a partition plate 23. The annular holder block 20 is made from heat resisting and heat insulative non-metal material, having a center through hole 203, a first annular groove 201 disposed at the top side around the center through hole 203, and a second annular groove 202 disposed at the bottom side around the center through hole 203. The O-rings 21;22 are respectively mounted in the first annular groove 201 and the second annular groove 202 on the annular holder block 20. The partition plate 23 is mounted to extend axially into to the center through hole 203 on the annular holder block 20. The leakage sealing device 2 is mounted in a groove 133 in a water circulation system 13. The partition plate 23 is inserted into a T-hole 130 in the water circulation system 13, dividing the T-hole 130 into a water inlet 131 and a water outlet 132. After installation of the leakage sealing device 2 in the water circulation system 13, the second O-ring 22 is forced into close contact with the surface of the groove 133 to stably support the annular holder block 20 in place and to seal the gap between the annular holder block 20 and the water circulation system 13, allowing water to pass through the center through hole 203 on the annular holder block 20. The cooling water guide, referenced by 3, comprises an annular locating member 30, an O-ring 31 mounted around the annular locating member 30, a partition plate 32 fixedly mounted in the annular locating member 30 and dividing the inside space of the annular locating member 30 into a water inlet 301 and a water outlet 302, a spiral guide plate 33 connected to the partition plate 32 and perpendicularly extended from the annular locating member 30. The annular locating member 30 is mounted in a groove 113 on a bottom die 11 and supported on the first O-ring 21 above the annular holder block 20 of the leakage sealing device 2, permitting the spiral guide plate 33 to be suspended in a blind hole 110 in the bottom die 11. After installation of the cooling water guide 3 in the bottom die 11, the partition plate 32 of the cooling water guide 3 and the partition plate 23 of the leakage sealing device 2 are abutted against each other and vertically aligned, and a spiral water circulation passage 132 is formed in the blind hole 110 around the spiral guide plate 33.

Referring to FIG. 3 again, when cooling the mold after the molding of a molding 12 in the cavity between the bottom die 11 and the upper die 10, cooling water is guided into the water inlet 131 on the water circulation system 13. Because the water outlet 130 is separated from the water inlet 131 by the partition plate 23, cooling water is stopped from flowing to the water outlet 130 directly, and forced to flow through the water inlet 301 on the annular locating member 30 into the spiral water circulation passage 112 along the spiral guide plate 33 and then to flow out of the blind hole 110 into the water outlet 130 in the water circulation system 13 via the water outlet 302 on the annular locating member 30. Because cooling water flows through the spiral water circulation passage 112, cooling water is turned round and round to effectively carry heat away from the bottom die 11, enabling the bottom die 11 to be evenly and efficiently cooled down. Further, because cooling water passes through the spiral water circulation passage 112 in the blind hole 110 in a spiral manner, cooling water circulation time is relatively increased, and any solid matter or soil can be quickly carried out of the blind hole 110 to prevent a blockage of the water passage.

Referring to FIG. 3 again, when the upper die 10 is closed on the bottom die 11, the cooling water guide 3 is pressed on the leakage sealing device 2 in the groove 133 on the water circulation system 13, and the O-rings 21;22 of the leakage sealing device 2 are compressed vertically to seal the gap, therefore cooling water passes from the water inlet 131, through the water inlet 301, the spiral water circulation passage 112 and the water outlet 302, and then to the water outlet 132 without causing a leakage.

While only one embodiment of the present invention has been shown and described, it will be understood that various modifications and changes could be made thereunto without departing from the spirit and scope of the invention disclosed.

What the invention claimed is:

1. A molding system comprising a bottom die having a bottom blind hole, an upper die controlled to mold a molding with said bottom die, and a water circulation system connected to said bottom die at a bottom side thereof, the water circulation system having a T-hole disposed in communication with the blind hole in said bottom die for circulation of cooling water to cool down said bottom die and the molding molded between said bottom die and said upper die, and a mounting groove at a top side thereof around one end of said T-hole wherein said bottom die has a mounting groove formed in said bottom side thereof around said blind hole; a leakage sealing device is mounted in said water circulation system to seal a gap between said water circulation system and said bottom die for permitting cooling water to be circulated through the T-hole in said water circulation system and the blind hole in said bottom die, said leakage sealing device comprising an annular holder block mounted in the mounting groove of said water circulation system, said annular holder block being made from heat resisting and heat insulative non-metal material, and having a center through hole in communication between said T-hole and said blind hole, a first annular groove disposed in a top side thereof around said center through hole, and a second annular groove disposed in a bottom side thereof around said center through hole, a first O-ring mounted in said first annular groove , a second O-ring mounted in said second annular groove and pressed against a wall in the mounting groove on said water circulation system, and a first partition plate mounted to extend axially into said center through hole on said annular holder block and inserted into said T-hole in said water circulation system, the first partition plate dividing said T-hole into a water inlet and a water outlet; a cooling water guide is mounted in the mounting groove of said bottom die for guiding cooling water from the water inlet of said T-hole through said blind hole to the water outlet in said T-hole, said cooling water guide comprising an annular locating member mounted in the mounting groove of said bottom die and pressed on the first O-ring of said leakage sealing device, an O-ring mounted around said annular locating member and pressed against a wall in the mounting groove of said bottom die, a second partition plate fixedly mounted in said annular locating member and abutted against and arranged in line with the first partition plate of said leakage sealing device, said second partition plate dividing an inside space of said annular locating member into a water inlet and a water outlet respectively in communication with the water inlet and water outlet in said T-hole, and a spiral guide plate connected to the second partition plate and perpendicularly extending from said annular locating member, said spiral guide plate defining a spiral water circulation passage in said blind hole for guiding cooling water from the water inlet in said T-hole and the water inlet in said annular locating member to the water outlet in said annular locating member and the water outlet in said T-hole.

\* \* \* \* \*